United States Patent [19]

Marchesini

[11] Patent Number: 4,991,377
[45] Date of Patent: Feb. 12, 1991

[54] METHOD FOR THE MUTUAL JOINING OF THE CAP AND THE BODY OF A CAPSULE USED TO ENCLOSE MEDICINES AND APPARATUS WHICH CARRIES OUT THIS METHOD

[76] Inventor: Massimo Marchesini, Pianoro, Bologna, Italy, 40065

[21] Appl. No.: 408,759

[22] Filed: Sep. 18, 1989

[30] Foreign Application Priority Data

Sep. 19, 1988 [IT] Italy .................. 3592 A/88
Nov. 21, 1988 [IT] Italy .................. 3666 A/88

[51] Int. Cl.⁵ .................................... B65B 51/20
[52] U.S. Cl. .................................... 53/478; 53/379; 53/900; 156/69
[58] Field of Search ............... 53/442, 454, 478, 485, 53/486, 487, 557, 560, DIG. 900, 379; 156/69

[56] References Cited

U.S. PATENT DOCUMENTS

| | | | |
|---|---|---|---|
| 583,683 | 6/1897 | Gersant et al. | 53/486 X |
| 2,314,527 | 3/1943 | Taylor | 53/900 X |
| 2,924,920 | 2/1960 | Margolis | 53/900 X |
| 3,186,910 | 6/1965 | Glassman | 53/485 X |
| 3,200,556 | 8/1965 | Ackley | 53/485 |
| 3,475,243 | 10/1969 | Scalora | 53/478 X |
| 3,601,954 | 8/1971 | Aronson | 53/900 X |
| 4,581,875 | 4/1986 | MacLaughlin et al. | 53/478 X |
| 4,771,903 | 9/1988 | Levene et al. | 53/478 X |

Primary Examiner—Horace M. Culver
Attorney, Agent, or Firm—Darby & Darby

[57] ABSTRACT

By means of the method proposed the joining of a cap and a body of a capsule used to enclose medicines, with the open end of the body already inserted in the cap, is achieved by directing a flow of hot compressed fluid, progressively on a circular portion of the cap overlapping a relative underlying circular portion of the body, so as to affect the entire circumference of the circular portion of the cap; the resulting seal between the said portions prevents separation, without breaking, of the cap or the body.

21 Claims, 1 Drawing Sheet

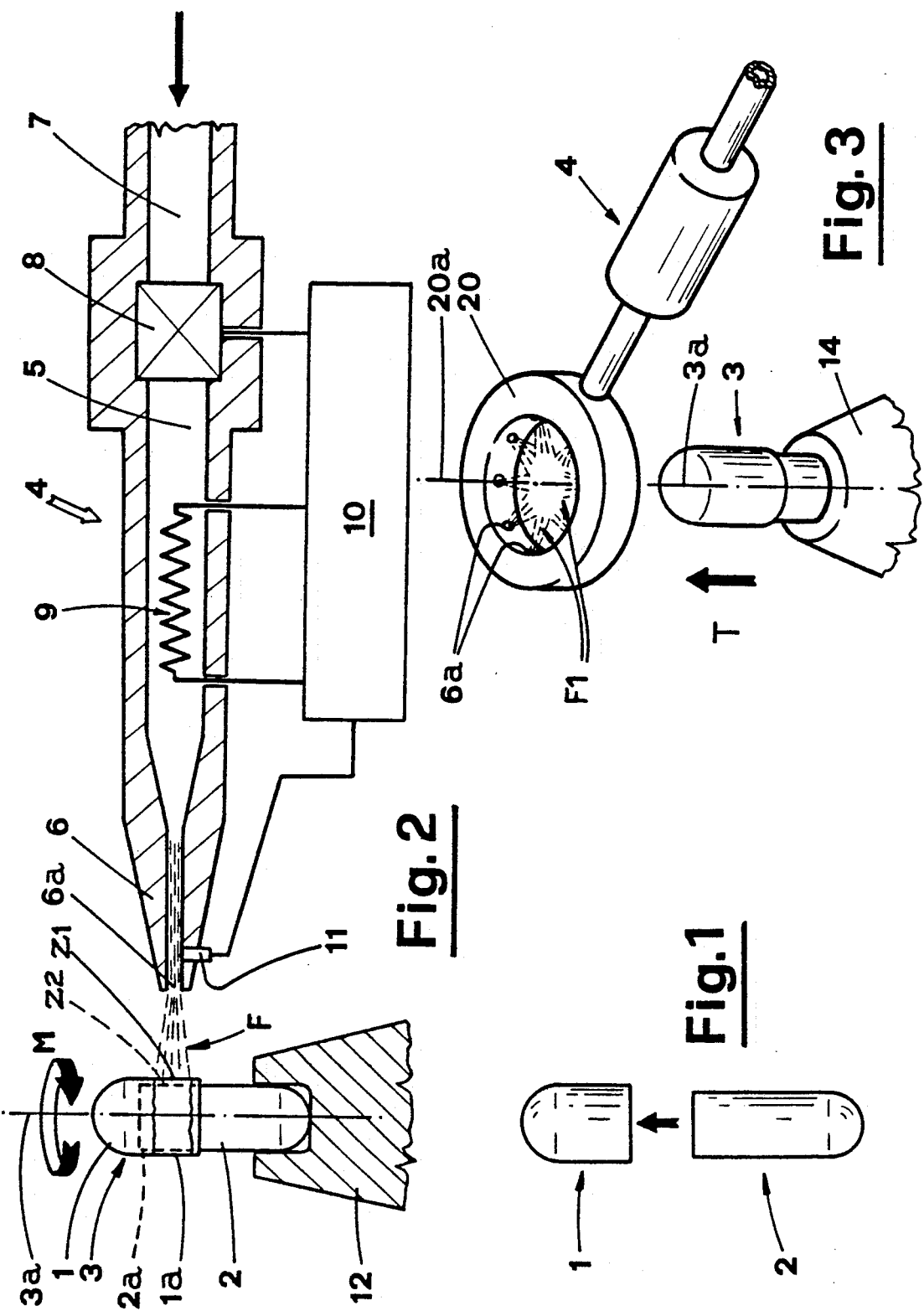

METHOD FOR THE MUTUAL JOINING OF THE CAP AND THE BODY OF A CAPSULE USED TO ENCLOSE MEDICINES AND APPARATUS WHICH CARRIES OUT THIS METHOD

BACKGROUND OF THE INVENTION

The invention relates to a method for the mutual joining of the cap and the body of a capsule used to enclose medicines as well as to the apparatus for carrying out such method.

DESCRIPTION OF THE PRIOR ART

It is common knowledge in the pharmaceutical sector that the term capsule is used to describe a soluble keratin, gelatin or similar sheath, used to enclose medicines which are unpleasant or which must pass unaltered through the stomach to the intestines. Said capsules consist of a tubular bottom, or body, closed at the lower end, and a cop with an internal diameter such as to permit the close fitting of the same cap onto the open end portion of the aforementioned body; in this way the latter portion is tightly overlapped by the cap.

The cap and the body joined in this way form a chamber which encloses the medicines.

Known capsules present a considerable disadvantage as a result of the extreme ease with which it is possible to separate the cap from the body; this offers a chance to those with evil intentions to alter the contents of the capsule.

To overcome this problem it is sufficient to reciprocally block, after placing the medicine in the body, the overlapping portions of the latter and the cap, obviously without using external substances (e.g. bonding agents).

Capsule Technology International Ltd., Windsor, Ontario (Canada) devised a method, and the relative apparatus to carry it out, by which the overlapping portions of the cap and the body are sealed together.

This method involves the use of a heated blade (sealer) pressed against the cap in correspondence with the portion of the latter which overlaps the body, and the relative movement between the cap and blade so that the entire circumference of the aforementioned portion is gradually covered.

The transmission of heat from the blade to the portion of the cap and from the latter to the underlying portion of the body, produces a localized softening (at most a partial melting) of the material with which these portions are formed and this, combined with the pressure exercised by the blade, produces the progressive sealing of the cap to the body.

In a preferential solution the blade is fixed and the capsule provided with a roto-translational movement so as to come into contact, with the relative overlapping portions, with the sealing blade.

This method effects a thin strip of the cap which is subjected, by means of the blade, to a temperature sufficient for the rapid passage of heat to the underlying strip of the body.

The temperature set by the sealer, to obtain an acceptable productivity (number of caps sealed by a blade in a set period of time) may lead to the work-hardening of the layer of the cap affected by the seal, with the obvious problems which arise as a consequence.

Moreover, with the sealer, it is quite difficult to maintain the same pressure along the entire circumference of the seal which is not optimum as regards the specific requirements of the latter.

Other problems with the above-mentioned method are due to the extreme difficulty in maintaining the sealing blade at a set temperature and to the fact that the same blade becomes dirty during use which on the one hand interferes with heat transmission towards the capsule and on the other makes frequent maintenance (cleaning) operations necessary.

Moreover, the contact between blade and capsule causes abrasions and/or mechanical stress on the latter which, in combination with any work-hardening of the sealed strip, lead to a number of rejects.

SUMMARY OF THE INVENTION

The object of the present invention is that of proposing a method for the joining of the capsule cap to the relative body, which overcomes the problems of the method mentioned in the foreword and which creates a seal along the circumference affecting the overlapping portions of the cap and body, without using any other material.

A further object of the invention is that of proposing a method which can be carried out using a simple, functional apparatus requiring a limited maintenance, as well as one that can be checked and/or controlled by unsophisticated devices.

The aforementioned objects are achieved by means of a method for the mutual joining of the cap and body of a capsule with the open end of the body already fitted inside the cap, this method envisaging the discharge of at least one flow of compressed fluid, with a preset pressure, capacity and temperature, directed towards a zone of the circular portion of the cap overlapping the relative underlying portion of the body, and the comtemporary reciprocal movement between the capsule and the flow in order to progressively affect within the zone a circular strip along the circular portion of the cap.

The action of the heat transmitted by the flow to the zone of the circular portion of the cap and by the latter zone transmitted to the relative underlying zone of the body, determines in the same zones temperature values such as to permit, in combination with the contemporary action of the pressure exercised by the flow on the zone of the circular portion of the cap, the joining by sealing of the overlapping surfaces of the circular portions progressively along the circular strip, in order to prevent the separation, without breaking, of the cap from the body.

In another version the method envisages the discharge of a flow of hot compressed fluid, with a preset pressure, capacity and temperature, directed towards the whole circular portion of the cap overlapping the relative underlying circular portion of the body, in order to affect the whole circular portion of the cap.

The apparatus for carrying out the method includes first means to maintain the capsule in a preset position, and second means which become operative with the capsule in the present position to obtain the joining, in correspondence with a circular strip on the circular portion of the cap and a circular portion of the body overlapped by the latter portion, by means of sealing, of the cap and body in order to prevent separation, without breaking, of the cap or of the body.

BRIEF DESCRIPTION OF THE DRAWINGS

The features of the invention are described below with particular reference to the attached drawings in which:

FIG. 1 illustrates the side view of the cap and the body of a capsule used to contain medicines;

FIG. 2 illustrates, in a schematic side view, one way of achieving the proposed method and the apparatus to carry it out;

FIG. 3 illustrates, in a diagrammatic perspective, another way of achieving the said method and the apparatus to carry it out.

DESCRIPTION OF THE PREFERRED EMBODIMENT

Referring to the above listed FIGS., 1 and 2 indicate the cap and body (both in keratin, gelatin or other similar substance) of a capsule 3 used to enclose known types of medicines, not described since they are not relevant to the invention. The open end of the body, as is known, is designed to fit inside the cap; in this way a circular portion 1a of the cap 1 overlaps a corresponding circular portion 2a of the body 2, as illustrated schematically in FIG. 2.

The method proposed assumes that the body and the cap are already joined as described above to form a chamber containing the said medicines.

In FIG. 2, 4 is used to indicate a apparatus designed to deliver a flow F of hot compressed fluid.

This fluid consists of gas (as in the example illustrated) for example hot dry air, hot moist air, water vapour, neutral gas, mixtures of neutral gases or any gas or gas mixture.

It is also possible to use, as a fluid, a suitable liquid or liquid mixture.

This apparatus is fitted with a longitudinal duct 5 connected on one side, by means of a pipe 7, to a source of compressed fluid (not illustrated), in the example illustrated compressed gas, and ending on the other side with an ejector 6 fitted with at least one hole 6a.

The said duct contains known means 8 designed to connect, or not, the duct 5 with the pipe 7 and at the same time regulate, in the event of connection, the capacity and/or the pressure of the said flow F; said means are controlled and checked by a control box 10.

Downstream of the means 8 a source of heat 9 is envisaged which may, for example, be represented by at least one electric element powered by the control box 10.

An appropriate instrument 11 placed in correspondence with the hole 6a of the ejector 6, permits the measurement of the temperature of the flow F; the relative measurement is sent to the control box 10.

By adjusting the power supply to the element 9, using known means (not illustrated) associated with the control box (10), it is possible to regulate the temperature of the flow F at the required value.

It is also possible to envisage known means (not illustrated) for the measurement of the capacity and pressure of the gaseous flow F in correspondence with the said hole 6a; said means send their measurements to the control box 10 which, by means of the element 9 and the said means 8, deals with adjusting the temperature, the capacity and the pressure of the flow F discharged by the ejector 6 to the preset values.

In the embodiment illustrated in FIG. 2, the capsule 3, by means of known means 12, is placed so that it encounters the flow F in the zone Z1 of the circular portion 1a of the cap 1; said means 12 drive the capsule 3 to rotate (towards M) about the relative axis 3a.

As a consequence zone Z1 progressively affects, along the circular portion 1a of the cap 1, a circular strip.

The flow F distributes heat to the said zone Z1 from where, by conduction, the heat is transmitted to the underlying zone Z2 of the body 2.

The temperature of flow F is such that it determines, at least in correspondence with the overlapping surfaces of the said zones Z1, Z2, temperature values which, with the contemporary compression action exercised by zone Z1 on the underlying zone Z2 (compression action induced by the pressure with which flow F encounters zone Z1 of the poriton 1a of the cap), lead to the sealing of the same surfaces.

This function is a consequence of the softening, at most a partial melting, of the materials from which the cap and body are made in correspondence with the said overlapping surfaces.

As has been stated, the capsule 3 turns towards M, therefore the said zones Z1, Z2 will progressively affect, in correspondence with the circular strip, the said circular portions 1a, 1a.

This determines the mutual joining, by sealing, of the cap and the body: the joining prevents separation, without breaking, of the said body or the said cap.

It is known that the tramsmission of heat from a gaseous fluid to a solid body is considerably increased by the relative speed between fluid and body.

The fact that a hot compressed gaseous fluid is used to heat the material of the portions Z1, Z2 permits a marked reduction in the gradient between the temperature of the external surface of zone Z1 and the temperature of the internal surface of the zone Z2, obviously with the same temperature value reached on the latter surface.

In this way it is possible to obtain, on the overlapping surfaces of zones Z1, Z2, temperatures which permit the sealing of the materials as already mentioned, without reaching in zone Z1 (in particular near the external surface) temperatures which would lead to work-hardening as in the known method described in the foreword.

The compression of Zone Z1 on Zone Z2 is obtained by the dynamic action of flow F; in this way avoiding contact between the ejector 6 and the capsule, thus with all the advantages involved in the maintenance of the ejector.

The quantity of heat transmitted to the capsule 3 in the set time, can be adjusted in the manner familiar to those skilled in the art, for example by adjusting the temperature of the flow F, or the speed or capacity of the same flow or all of the three parameters just mentioned; the device which carries out this adjustment (in the example illustrated the control box 10) is not at all sophisticated, and is well within the reach of the average person skilled in the art.

In the proposed method there is no contact between metal parts and the capsule: thus avoiding abrasions and/or mechanical stress on the latter.

Again with the proposed method no other material is used to obtain the seal.

Finally the method proposed permits the mutual joining of the cap and body of a capsule fulfilling the specific requirements (i.e. the separation of the cap from the body can only be obtained by breaking one or the other or both of these), with no rejects and a minimum of maintenance for the apparatus 4.

In the embodiment illustrated, the axis of the flow F is assumed to be fixed and the capsule 3 rotating; the same result can be obtained assuming the capsule 3 fixed and the axis of the flow F mobile so that it progressively affects the circular strip.

In general, the capsule 3 and the axis of the flow F can have relative movements so that the latter progressively affects the said strip.

The version illustrated in FIG. 3 envisages a circular chamber 20 with angularly equidistant ejectors 6a on its inside surface, with their axes arranged radially with respect to the same axis 20a. From the ejectors 6a quantities F1 of the said flow F are discharged directed towards the said axis 20a.

The capsule 3 is blocked by known means 14 which deal with traversing (towards T) the capsule so that the circular portion 1a of the cap 1 is positioned in correspondence with the flow F.

As a consequence the flow F affects the entire said circular portion 1a and the sealing of the overlapping portions 1a, 2a takes place gradually but simultaneously, along the circular strip.

For a uniform distribution of heat in correspondence with the said strip, a slight rotation of the capsule on its axis can be adopted. As an alternative, it is possible to maintain the capsule 3 fixed and move the chamber 20 axially, with the possible rotation of the latter about its axis 20a. What has been described above is intended purely as an example and is not limiting, therefore any variations in the method proposed (e.g., as mentioned, in place of a gaseous fluid it is possible to use a liquid flow consisting of a liquid or a mixture of liquids) and/or the apparatus to carry out this method, falls within the area covered by the invention as claimed hereunder.

What is claimed is:

1. A method using a flow of fluid for joining a cap and body of a capsule used to enclose medicines, said body having and end fitted inside an open end of said cap, a portion of said cap overlapping a correspondingly shaped portion of said body, comprising the steps:
   (a) directing a flow of heated fluid from a source to impinge said overlapped portions on said capsule;
   (b) moving said capsule and flow relative to each other causing said flow to heat a peripheral overlapped strip on said cap;
   (c) adjusting the rate, pressure and temperature of said flow source to transmit heat at a desired rate from said fluid flow into said cap in said strip, and from said cap to said overlapped portion of said body in said strip, whereby said body and cap overlapped portions soften and seal together.

2. A method as in claim 1, wherein said flow is delivered in a single stream and said strip is progressively heated around the periphery thereof by said relative motion of said capsule and said flow.

3. The method as in claim 2, wherein step (b) of moving relative to each other is effected by maintaining said source of said flow fixed in position and rotating said capsule about its axis, said axis being transverse to a cross-section enclosed by said strip.

4. The method as in claim 1, wherein said flow is delivered in a plurality of streams concurrently, the entire peripheral strip being heated substantially simultaneously.

5. A method as in claim 4, wherein said step (b) of moving relative to each other is effected by directing said plurality of streams radially inward toward a center point, positioning said capsule at said center point, and rotating said capsule.

6. A method as in claim 1, wherein said capsule is circular in cross-section and said peripheral strip is circular.

7. A method as in claim 1, wherein said flow is pressurized and at high velocity.

8. A method as in claim 1, wherein, preceding step (a), said capsule is positioned to intercept said fluid flow prior to initiation of fluid flow.

9. A method as in claim 1, wherein said fluid is a gas.

10. A method as in claim 1, wherein said fluid is a gas mixture.

11. A method as in claim 1, wherein said fluid is a liquid.

12. A method as in claim 1, wherein said fluid is a liquid mixture.

13. An apparatus using a flow of fluid for joining a cap and body of a capsule used to enclose medicines, said body having an end fitted inside and open end of said cap, a portion of said cap overlapping a correspondingly shaped portion of said body, comprising:
    a source outputting a high velocity fluid flow;
    means for positioning said capsule with said overlapped portions intercepting said fluid flow;
    means for heating said fluid flow prior to contact of said fluid with said capsule, said heated flow softening said overlapped layers and producing sealing thereat.

14. An apparatus as in claim 13, wherein said source of high velocity fluid flow includes a plurality of flow ejectors positioned to surround a capsule held by said means for positioning.

15. An apparatus as in claim 14, and further comprising means for rotating said capsule during flow of said fluid.

16. An apparatus as in claim 15, wherein said means for positioning is adapted to translate said capsule between said position with said overlapped portions intercepting said fluid flow and a second position away from said fluid flow.

17. An apparatus as in claim 14, wherein said means for positioning is adapted to translate said capsule between said position with said overlapped portions intercepting said fluid flow and a second position away from said fluid flow.

18. An apparatus as in claim 13, and further comprising means for rotating said capsule, a peripheral strip of said overlapped portions being progressively heated during said rotation.

19. An apparatus as in claim 13, and further comprising means for regulating the rate and pressure of said flow, and means for heating said flow.

20. An apparatus as in claim 19, wherein said means for regulating said flow includes a sensor and a valve, and said means for heating said flow includes an electrical heating resistance.

21. An apparatus as in claim 13, wherein said fluid flow is air.

* * * * *